US 6,611,817 B1

(12) United States Patent
Dorrance et al.

(10) Patent No.: US 6,611,817 B1
(45) Date of Patent: Aug. 26, 2003

(54) AUTOMATED TECHNIQUE FOR CODE GENERATION OF DATASTREAM MAPPINGS

(75) Inventors: Daniel M. Dorrance, Round Rock, TX (US); Jerry Walter Malcolm, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/335,293

(22) Filed: Jun. 17, 1999

(51) Int. Cl.⁷ .............................................. G06F 17/60
(52) U.S. Cl. ....................................................... 705/39
(58) Field of Search ............................ 705/65; 379/229

(56) References Cited

U.S. PATENT DOCUMENTS

| 5,530,852 | A | | 6/1996 | Meske, Jr. et al. |
| 5,706,442 | A | | 1/1998 | Anderson et al. |
| 5,708,826 | A | | 1/1998 | Ikeda et al. |
| 5,737,607 | A | | 4/1998 | Hamilton et al. |
| 5,745,360 | A | | 4/1998 | Leone et al. |
| 5,745,908 | A | | 4/1998 | Anderson et al. |
| 5,754,772 | A | | 5/1998 | Leaf |
| 5,761,673 | A | | 6/1998 | Bookman et al. |
| 5,781,739 | A | | 7/1998 | Bach et al. |
| 6,151,390 | A | * | 11/2000 | Volftsun ...................... 379/229 |
| 6,327,578 | B1 | * | 12/2001 | Linehan ........................ 705/65 |
| 6,341,285 | B1 | * | 1/2002 | Blott .............................. 707/8 |

FOREIGN PATENT DOCUMENTS

| GB | 2 313 456 A | 11/1997 | |
| WO | WO 98/20644 | 5/1998 | |
| WO | WO 98/24050 | 6/1998 | |
| WO | WO 01/90951 | 5/2000 | ............ G06F/17/60 |

OTHER PUBLICATIONS

"Attention Wireless". Internet Cuts Billing Costs Gohring, N Telephony V234N21 pp 56, May 25, 1998.
U.S. patent application Ser. No. 09/339,706, Meske, Jr. et al., filed Jun. 24, 1999.
Service to Enable Common Gateway Interface Programs Within Tivoli Management Environment Netfinity Based Internet Applications, IBM Technical Disclosure Bulletin, vol. 40, No. 07, Jul. 1997, pp. 1–4.
Method to Convert Graphical User Interface Definitions and Windows to HyperText Markup Language, IBM Technical Disclosure Bulletin, vol. 40, No. 08, Aug. 1997, pp. 167–173.
Web Browser Hyper Text Markup Language Conversion to Systems Network Architecture, IBM Technical Disclosure Bulletin, vol. 41, No. 01, Jan. 1998, p. 667.

* cited by examiner

Primary Examiner—Geoffrey Akers
(74) Attorney, Agent, or Firm—David A. Mims, Jr.; Bracewell & Patterson, L.L.P.

(57) ABSTRACT

Complex data protocols, such as the financial protocols OFX and Gold, generate data streams in which some elements may not have a one-to-one mapping between protocols, some elements may have only conditional mapping between protocols, and some elements may not supply fields or parameters under a first protocol which are required under the second protocol. Executable code and/or data structures for data conversion between such complex protocols are automatically generated. An exhaustive definition of each protocol in machine readable format is obtained, complex mapping rules between elements are broken into atomic operations and procedures which are definable and encapsulated, and a structured flow for element conversion between protocols is defined. A mapping definition language specifying the mappings and procedures for each step in converting all elements is architected, and a tool is written to interpret the protocol definitions and the mapping definition, then generate the appropriate executable code and/or data structures. Manual coding is substantially reduced and product quality increase with reduction of handcrafted code.

24 Claims, 7 Drawing Sheets

OFX Transactions for PMTTRNRQ

Cell Background Color Key

| | OFX Transaction Modifier | SubTxnId | Status | Mapped Gold Transactions | Txn Process Method | Comments |
|---|---|---|---|---|---|---|
| Mapping | PMTCANCRQ | CAN_PAYMENT | -- | DEL_VAR_PYMT_TXN | TxnProcessMethod_DefaultProcessTxnMethod | -- |
| Mapping | PMTMODRQ & PAYEE & PAYEELSTID | MOD_PAYMENT_CASE1 | -- | PAYEE_DTL_TXN PAYMENT_INQ_TXN CHNG_PAYEE_TXN CHNG_VAR_PYMT_TXN | TxnProcessMethod_Gold_Modify_PmtPay | Change payee and payment (Case 1) |
| Mapping | PMTMODRQ & PAYEEID & PAYEELSTID | MOD_PAYMENT_CASE2 | -- | PAYEE_DTL_TXN PAYMENT_INQ_TXN CHNG_PAYEE_TXN CHNG_VAR_PYMT_TXN | TxnProcessMethod_Gold_Modify_Pmt | Modify a payment (Case 2) |
| Mapping | PMTMODRQ & PAYACCT & PAYEELSTID | MOD_PAYMENT_CASE3 | -- | PAYEE_DTL_TXN PAYMENT_INQ_TXN CHNG_PAYEE_TXN CHNG_VAR_PYMT_TXN | TxnProcessMethod_Gold_Modify_PmtPay | (Case 3) payeeid modified Server detects via INQ? |
| Mapping | PMTRQ & PAYEE & PAYEELSTID | ADD_PAYMENT_CASE1 | -- | PAYEE_DTL_TXN CHNG_PAYEE_TXN ADD_VAR_PYMT_TXN | TxnProcessMethod_Gold_Payment | (Case 1)(SubTxn 4) An Implicit Change Payee with new Payment |
| Mapping | PMTRQ & PAYEEID & PAYEELSTID | ADD_PAYMENT_CASE2 | -- | PAYEE_DTL_TXN ADD_VAR_PYMT_TXN | TxnProcessMethod_Gold_Payment | (Case 2)(SubTxn 5) Payeeid means Biller in Gold. No implicit change in this case since only CSR changes Biller |
| Mapping | PMTRQ | ADD_PAYMENT_CASE3 | -- | ADD_PAYEE_TXN ADD_VAR_PYMT_TXN PAYEE_DTL_TXN | TxnProcessMethod_Gold_Payment_Payeeid | (Case 3 & 4)(SubTxn 6) OFX syntax allows Payeeid, but it does not make sense |

Fig. 4A

OFX Request

| OFX Nesting | DTD Rules | Mapping Method | Mapping Parms | Comments | OFX Data Type | Match String |
|---|---|---|---|---|---|---|
| PMTTRNRQ | [Required] | | | | | 0 |
| ( | [Required] | | | | | |
| TRNUID | [Required] | OFXReqPropMethod_OFX_to_Atom | %trnuid | | UUIDTYPE | **/TRNUID[-] |
| CLTCOOKIE | [Optional] | OFXReqPropMethod_OFX_to_Atom | %cltcookie | | STRTYPE | **/CLTCOOKIE[-] |
| TAN | [Optional] | OFXReqPropMethod_OFX_to_Atom | %tan | | STRTYPE | **/TAN[-] |
| ) | | | | | | |
| PMTCANCRQ | [Mutually exclusive] | | | | | |
| ( | [Required] | | | | | |
| SRVRTID | [Required] | OFXReqPropMethod_SrvrtidOFX_to_Atom | IfsDelPymtRqstTg_PayeeNbrIdTg IfsDelPymtRqstTg_PaymtDefnIdTg | Tag 792 also used for recsrvrtid | SRVRIDTYPE | PMTTRNR?/PMTCANCR?/SRVRTID[-] |
| ) | | | | | | |

Fig. 4B

| OFX Response | | | | | |
|---|---|---|---|---|---|
| OFX Nesting | DTD Rules | Mapping Method | Mapping Parms | Usage Criteria Method | Usage Criteria Parms | Comments |
| PMTTRNRS | [Required] | | | | | |
| ‌ ( | [Required] | | | | | |
| ‌│ TRNUID | [Required] | OFXRespPropMethod_Atom_to_OFX_Token | %trnuid | | | |
| ‌│ STATUS | [Required] | | | | | |
| ‌│ ‌│ CODE | [Required] | OFXRespPropMethod_ValueMap_Error (Process_Status_Code) | IfsRespDtlTg_RespCodeCITg %CachedErrorCode "2000" | | | Default OFX Error Code |
| ‌│ ‌│ SEVERITY | [Required] | OFXRespPropMethod_SeverityValueMap (Process_Status_Severity) | IfsRespDtlTg_RespCodeCITg0 ERROR | | | |
| ‌│ ‌│ MESSAGE | [Optional] | | | UsageCriteriaMethod_NeverInclude | | |
| ‌│ CLTCOOKIE | [Optional] | OFXRespPropMethod_Atom_to_OFX | %cltcookie | UsageCriteriaMethod_RqstTagPresent | @CLTCOOKIE | |
| ‌│ ( | [Optional] | | | UsageCriteriaMethod_ErrorCheck | %CachedErrorCode | |
| ‌│ PMTCANCRS | [Mutually exclusive] | | | UsageCriteriaMethod_AlwaysInclude | | |
| ‌│ ‌│ SRVRTID | [Required] | OFXRespPropMethod_Srvrtid_Atom_to_OFX | IfsDelPymtRqstTg_PayeeNbrIdTg IfsDelPymtRqstTg_PymtDefnIdTg | | | Tag 792 also used for recsrvrtid |
| ‌│ ) | | | | | | |
| ) | | | | | | |

Fig. 4C

DEL_VAR_PYMT_TXN - Request Atoms

| Gold Atom | Atom Repeat Level | Mapping Method | Mapping Parms | Comments |
|---|---|---|---|---|
| IfsCnsmrIdTg_CnsmrIdTg | 0 | GoldReqPropMethod_CopyAtom | IfsCnsmrPrflDtlTg_CnsmrTg_CnsmrIdTg | |
| IfsCnsmrIdTg_ChCnsmrIdTg | 0 | GoldReqPropMethod_CopyAtom | IfsCnsmrPrflDtlTg_CnsmrTg_ChCnsmrIdTg | |
| IfsCnsmrIdTg_PermUserIdTg | 0 | GoldReqPropMethod_CopyAtom | IfsCnsmrPrflDtlTg_CnsmrTg_PermUserIdTg | Apply Encryption |
| IfsDelPymtRqstTg_SrvcRqstScrtyTg_repeatCounter | 0 | GoldReqPropMethod_Mapped_From_OFX_IN | -- | -- |
| IfsDelPymtRqstTg_SrvcRqstScrtyTg_ScrtyIdTg | 1 | GoldReqPropMethod_IGNORE_Not_Mapped | -- | -- |
| IfsDelPymtRqstTg_SrvcRqstScrtyTg_ScrtyEncryptTpCITg | 1 | GoldReqPropMethod_IGNORE_Not_Mapped | -- | -- |
| IfsDelPymtRqstTg_PymtDefnIdTg | 0 | GoldReqPropMethod_Convert_From_OFX_IN | SRVRTID | Used in conjunction with PayeeNbrIdTg |
| IfsDelPymtRqstTg_PayeeNbrIdTg | 0 | GoldReqPropMethod_Mapped_From_OFX_IN | | Both PayeeLstID and SRVRTID |

Fig. 4D

DEL_VAR_PYMT_TXN - Response Atoms

| Gold Atom | Atom Repeat Level |
|---|---|
| IfsRespDtlTg_RespCodeCITg | 0 |
| IfsRespDtlTg_FiRfrNbrIdTg | 0 |
| IfsRespDtlTg_SrvcPrvdRfrIdTg | 0 |
| IfsRespDtlTg_FiProcIndTg | 0 |
| IfsPymtRjctRespTg_PymtRjctRespTg | 0 |

Fig. 4E

AUTOMATED TECHNIQUE FOR CODE GENERATION OF DATASTREAM MAPPINGS

RELATED APPLICATIONS

The present invention is related to the subject matter of commonly assigned, copending U.S. patent application Ser. No. 09/339,706 entitled "METHOD AND TECHNIQUE FOR SIGNING FINANCIAL TRANSACTIONS" and filed Jun. 24, 1999. The content of the above-identified application is incorporated herein by reference.

BACKGROUND OF THE INVENTION

1. Technical Field

The present invention relates in general to conversion between data protocols and in particular to conversion between complex data protocols, such as financial protocols, for which data mappings may not be either direct or without gaps. Still more particularly, the present invention relates to automatically generated executable code and data structures for converting data between two complex protocols.

2. Description of the Related Art

In data processing systems which convert datastreams from one architected protocol to another, translation operations on the data are required. In performing such translations, data mappings are typically devised to describe the requisite conversions. Some data mappings are straightforward or even trivial, such as that required for conversion between the American National Standard Code for Information Interchange (ASCII) and Extended Binary Code Decimal Interchange Code (EBCDIC) formats. Other data mappings, on the other hand, may be very complex. For instance, conversion between two airline control protocols for flight scheduling and routing or between financial protocols for electronic payment transactions may involved data mappings at various levels of the data model.

In these cases, a multitude of data translation operations at different levels may be required, from high level transaction identification to element level data structures. Additionally, there may be run time translations dependent upon previous operational details. To write and maintain code in such a complex environment, particularly when a datastream is evolving and subject to constant change, is extremely difficult.

For instance, two leading financial protocols are: the Open Financial Exchange (OFX) specification, a standard generalized markup language (SGML) based, hypertext transmission protocol (HTTP) compliant financial protocol utilized by products such as Quicken and Microsoft Money to provide online banking services to their customer, with the current version 1.5.1 available at www.ofx.net; and the Integrion GOLD standard, a binary, structure-oriented protocol employed by banks within the Integrion Financial Network, with the current version 98.1 available at www.integrion.net.

A protocol converter is required to allow Quicken and other OFX clients to work with Integrion banks. While OFX and Gold both provide fundamentally the same types of functions (e.g., Balance Inquiry, Statement History, Transfers, Bill Pay, etc.), in many cases the transactions and/or transaction parameters for similar functions vary widely between the protocols. One OFX request may require execution of two or three Gold transactions, and certain Gold transactions within that series may need to be executed only where a certain property is set on the OFX request. Required properties within a Gold request may not always be provided within the OFX request, so that the appropriate Gold field must be retrieved elsewhere or calculated.

Furthermore, any converter enabling interoperability between the OFX and Gold protocols should be bidirectional, which further complicates the conversion process. All things considered, the mapping required for conversion between OFX and Gold is very complex. Conventional coding practices to create a converter would require a massive amount of code, would be extremely time-consuming to write, and would be very difficult to maintain.

It would be desirable, therefore, to automatically generate executable code and/or data structures to perform the protocol conversion, with a minimum of handcrafted code.

SUMMARY OF THE INVENTION

It is therefore one object of the present invention to provide improved conversion between data protocols.

It is another object of the present invention to provide improved conversion between complex data protocols, such as financial protocols, for which data mappings may not be either direct or without gaps.

It is yet another object of the present invention to automatically generate executable code and data structures for converting data between two complex protocols.

The foregoing objects are achieved as is now described. Complex data protocols, such as the financial protocols OFX and Gold, generate data streams in which some elements may not have a one-to-one mapping between protocols, some elements may have only conditional mapping between protocols, and some elements may not supply fields or parameters under a first protocol which are required under the second protocol. Executable code and/or data structures for data conversion between such complex protocols are automatically generated. An exhaustive definition of each protocol in machine readable format is obtained, complex mapping rules between elements are broken into atomic operations and procedures which are definable and encapsulated, and a structured flow for element conversion between protocols is defined. A mapping definition language specifying the mappings and procedures for each step in converting all elements is architected, and a tool is written to interpret the protocol definitions and the mapping definition, then generate the appropriate executable code and/or data structures. Manual coding is substantially reduced and product quality increase with reduction of handcrafted code.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIGS. 4A–4E are a set of tables for mapping data between two protocols in accordance with a preferred embodiment of the present invention.

DETAILED DESCRIPTION OF THE PREFERRED EMBODIMENT

Figure 1:
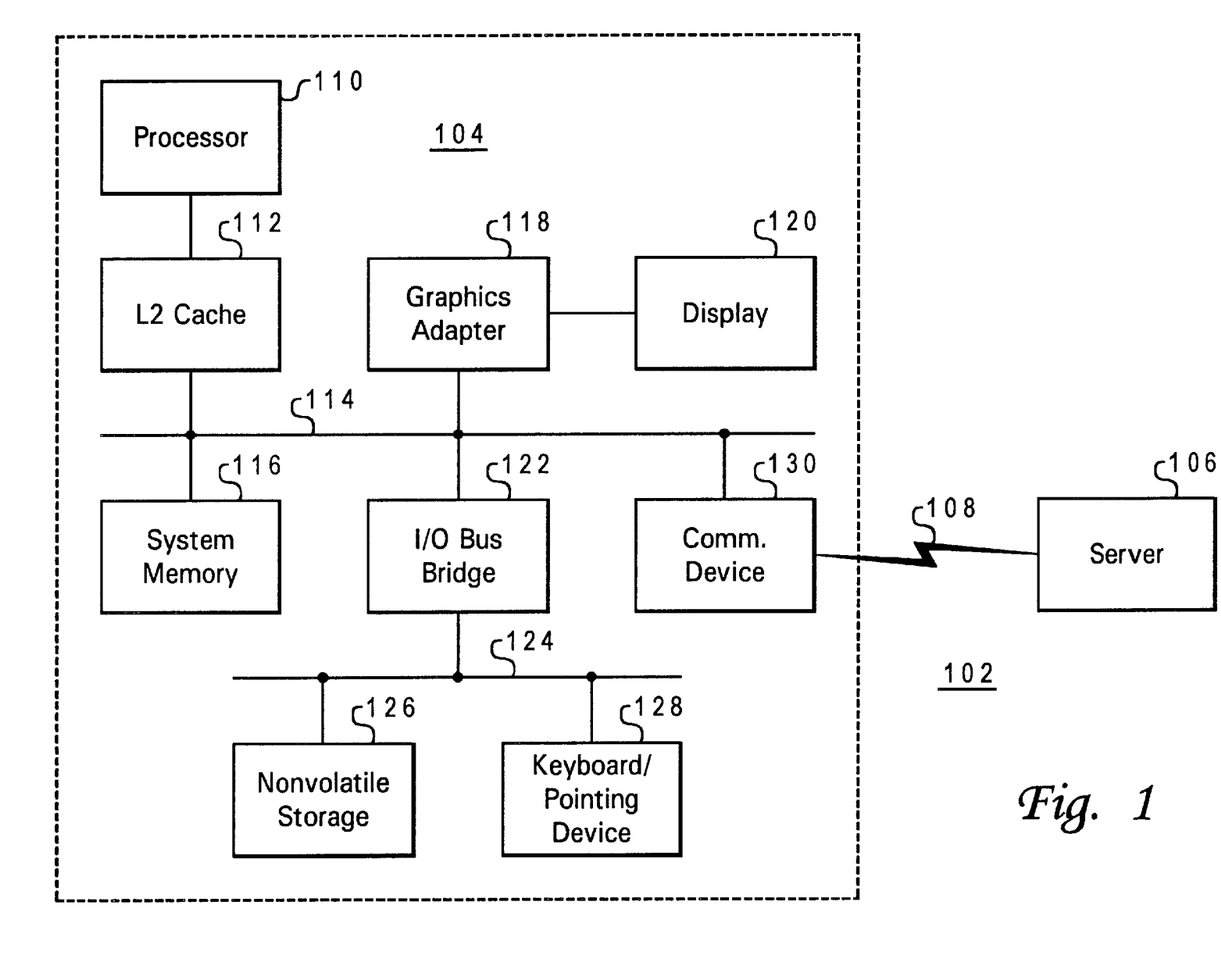
FIG. 1 depicts a block diagram of a data processing system network in which a preferred embodiment of the present invention may be implemented.

With reference now to the figures, and in particular with reference to FIG. 1, a block diagram of a data processing system network in which a preferred embodiment of the present invention may be implemented is depicted. Data processing system 102 includes a client data processing system 104 and a server data processing system 106 coupled by a communications link 108.

Data processing system 104 may be one of the models of personal computers available from International Business Machines Corporation of Armonk, N.Y., while data processing system 106 may be one of the business server systems available from the same source. Although referred to as a "client" data processing system, data processing system 104 is merely contemplated in the exemplary embodiment to be a system utilized by a customer of a financial institution and no architectural limitation is implied. Similarly, "server" data processing system 106 is contemplated in the exemplary embodiment to be a system employed by a financial institution for supporting electronic commerce by the customers of that institution. While the configuration in which data processing system 104 runs a client application and data processing system 106 is a server may be most common, the present invention is not limited to such an architecture.

Data processing system 104 includes processor 110, which in the exemplary embodiment is connected to a level two (L2) cache 112, which is connected in turn to a system bus 114. Also connected to system bus 114 is system memory 116 and graphics adapter 118 coupling system bus 114 to a display 120. Input/output (I/O) bus bridge 122 connected to system bus 114 couples I/O bus 124 to system bus 114, relaying and transforming data transactions from one bus to the other. Peripheral devices such as nonvolatile storage 126, which may be a hard disk drive, and keyboard/pointing device 128, which may include keyboard and a conventional mouse, a trackball, or a digitizer pad, are connected to I/O bus 124. Data processing system 104 also includes a communications device 130, such as a modem and/or network interface card, enabling data processing system 104 to communicate with server 106 via communications link 108, such as through a dial-up or over the Internet.

The operation of data processing systems 104 and 106 and techniques for enabling communications between such systems are well known to those in the art. An operating system, such as one of the Windows operating systems available from Microsoft Corporation of Redmond Wash. or the Advanced Interactive Executive (AIX) operating system available from International Business Machines Corporation of Armonk, N.Y., executes within data processing systems 104 and 106 to allow applications to be run. The applications may interact with each other utilizing, for example, the well-known Ethernet and/or Transmission Control Protocol/Internet Protocol (TCP/IP) architectures. One such application set may involve exchanging signed data between different protocols (e.g., different financial protocols as described above) and preferably employs the mechanism for properly signing amounts in accordance with the present invention, described in further detail below.

The exemplary embodiment shown in FIG. 1 is provided solely for the purposes of explaining the invention and those skilled in the art will recognize that numerous variations are possible, both in form and function. For instance, data processing system 104 may include a CD-ROM and/or DVD drive, a sound card and speakers, or other peripheral devices. All such variations are believed to be within the spirit and scope of the present invention.

Figure 2:
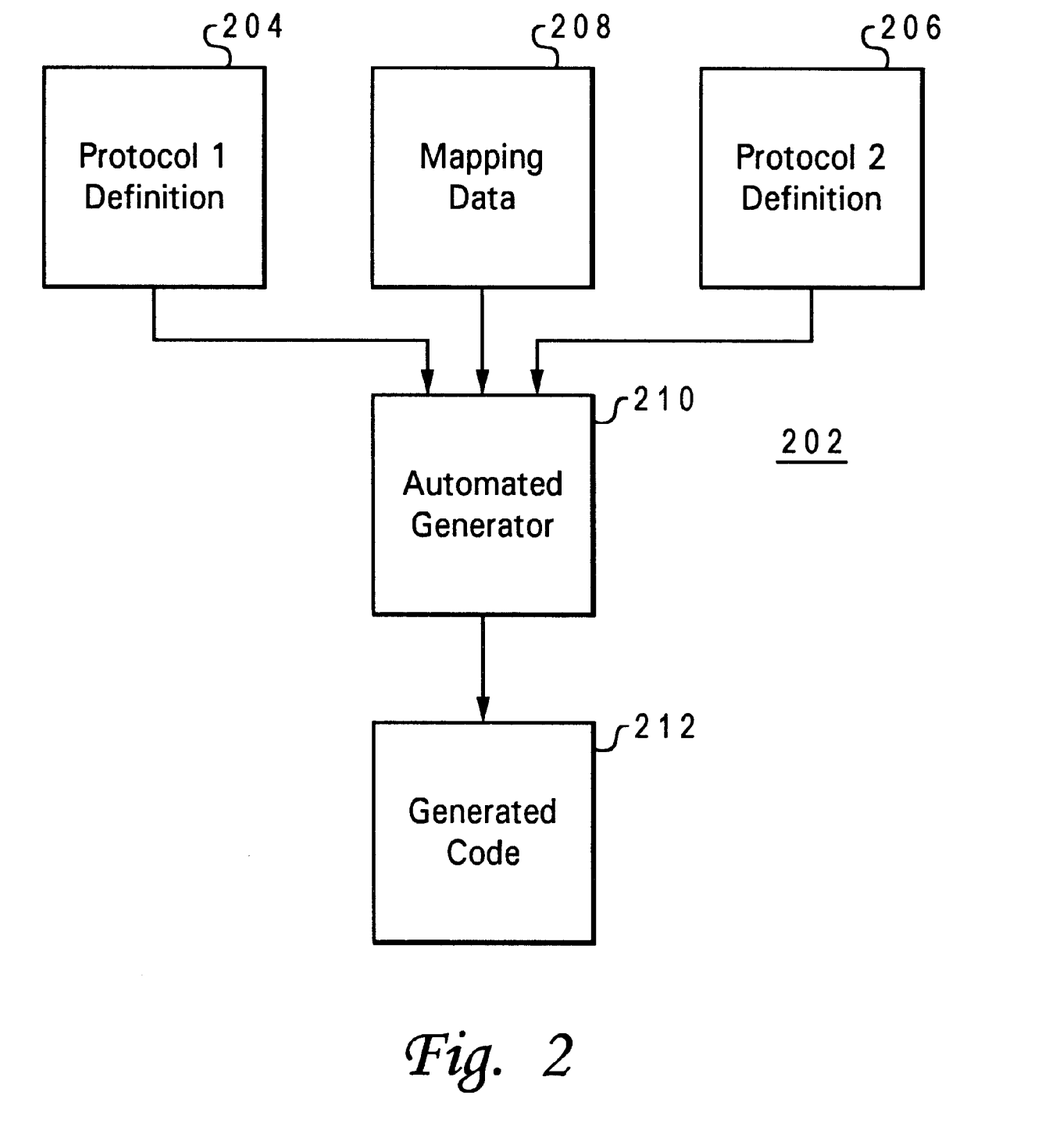
FIG. 2 is a block diagram of a mechanism for automatically generating executable code and data structures for protocol conversion in accordance with a preferred embodiment of the present invention.

With reference now to FIG. 2, a block diagram of a mechanism for automatically generating executable code and data structures for protocol conversion in accordance with a preferred embodiment of the present invention is illustrated. Such automatic generation is achieved in the present invention by:

1. Breaking the complex mapping rules into atomic operations and procedures which are definable and encapsulated;
2. Defining a structured flow for each elemental conversion which will occur;
3. Starting with an exhaustive definition of both protocols in machine readable format, architecting a mapping definition language that specifies the mappings and procedures for each step in the conversion process for all elements in the two protocols; and
4. Writing a tool which interprets the two protocol definitions and the mapping definition and generates the appropriate code and/or data structures. The system 202 shown in FIG. 2 follows this procedure. Protocol 1 and protocol 2 definitions 204 and 206 are exhaustive definitions of the respective protocols in machine readable format. Mapping data 208 specifies the mappings and procedures for each conversion of any element between protocol 1 and protocol 2. Automated generator 210 interprets the protocol definitions 204 and 206 and the mapping data 208 and generates code 212, including executable code and data structures, for conversion between protocols.

Figure 3:
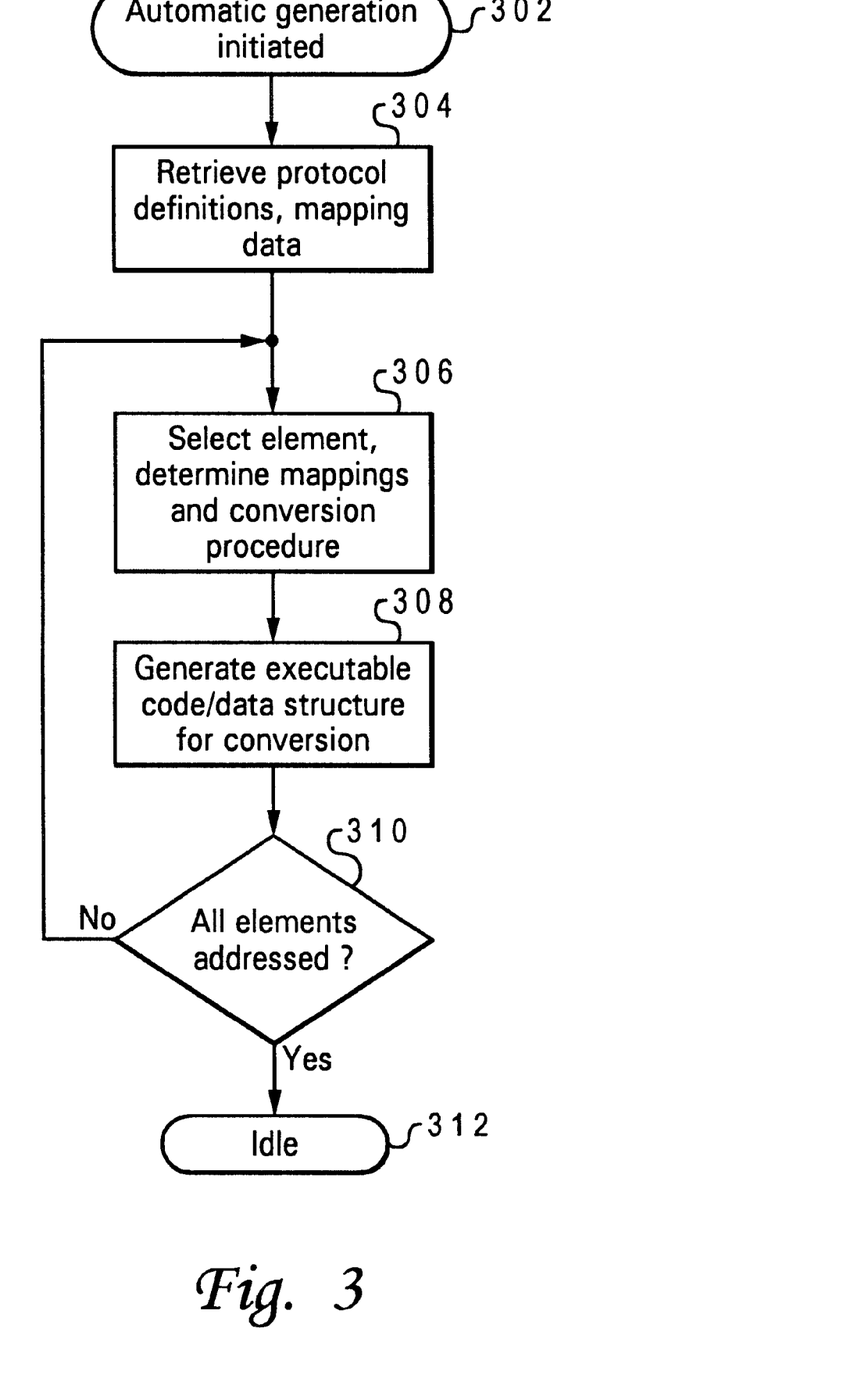
FIG. 3 depicts a high level flow chart for a process of automatically generating executable code and/or data structures for protocol conversion in accordance with a preferred embodiment of the present invention.

With reference now to FIG. 3, a high level flow chart for a process of automatically generating executable code and/or data structures for protocol conversion in accordance with a preferred embodiment of the present invention is depicted. The process begins with step 302, which depicts automatic generation being initiated.

The process first passes to step 304, which illustrates retrieving the exhaustive protocol definitions, in computer usable form, of both protocols for which the converter is to be generated, together with the mapping data defined for conversion between the two protocols. The process next passes to step 306, which depicts selection of an element within one protocol for which conversion to the other protocol is to be generated, and determination of the mappings and procedures required for conversion.

The process then passes to step 308, which illustrates generating the executable code and/or data structures necessary to convert the selected element from the first protocol to the second protocol. The process passes next to step 310, which depicts a determination of whether conversion for all elements has been addressed. This includes all elements of both protocols, with conversion required from one protocol to the other regardless of the initial protocol of the data element.

If all elements have not been addressed, the process returns to step 306 to repeat steps 306 and 308 for a next element selected within either protocol. If all elements have been addressed, the process passes instead to step 312, which illustrates the process becoming idle until generation of source code and/or data structures for protocol data conversion is again required, either for the same or for different protocol sets.

The present invention may be employed to automatically generate code on an as needed basis. For example, if an OFX request is received by an automatic converter employing the present invention, the converter may employs the following steps:

Step 1—Utilize the OFX protocol definition to determine which OFX request was received, then lookup the received request in the mapping data to determine which Gold request(s) should be formulated. Utilize the Gold protocol definition to allocate the appropriate request buffers for the Gold request(s).

Step 2—For every input property within the received OFX request, determine, from the mapping data, where the field should be placed within the Gold request(s). Options may include:
  a) direct mapping, in which the field contents are placed in a specified corresponding field;
  b) conversion of the field contents to a different, specified format and placement of the converted value in a specified field;
  c) use of the field to lookup a value within an internal mapping table, then storing the extracted value in a specified field in the Gold request (e.g., OFX has an account type "XYZ" while Gold calls the same account type "ABC");
  d) saving the field, although not required for the Gold request, since it must be returned on the OFX response; and
  e) custom handling according to rules specified in the mapping file, which is permitted by the architecture.

Step 3—Once all OFX fields are processed and the available input data is exhausted, open fields not yet populated within the Gold request(s) are very likely to exist. Each field within the Gold request(s) is processed, and handled in one of the following manners:
  a) skipped because the field was filled during a previous step;
  b) hardcoded to a specified value (e.g., "−3");
  c) retrieving a field passed in a previous OFX request, which was saved, and utilizing that value;
  d) retrieving a field from an earlier Gold response;
  e) retrieving the field from a configuration file;
  f) custom handling as described above.

Step 4—Send the Gold request(s). Since the OFX request can require multiple Gold transactions, there must be rules specified on ordering and any conditional logic associated with sending the Gold transactions. These ordering and conditional rules are specified in the mapping data.

Step 5—Once the Gold transactions have been completed, build the OFX response. The OFX protocol definition specifies which fields must be included in the response, including, for each property and grouping of properties, whether the field is required, optional, mutually exclusive, or multiple. For every field other than required fields, the mapping data must dictate rules regarding when the field in included and, in the case of multiples, how many instances of the field should be included. For every field to be included, the information on where to get the data is retrieved, which may include:
  a) direct one-to-one field mapping from the Gold response;
  b) calculated values from the Gold response;
  c) utilizing the Gold response field for a lookup;
  d) utilizing a value saved from the request input;
  e) echoing a value sent on the Gold request;
  f) utilizing configuration file information; and/or
  g) custom handling.

The problem addressed by the present invention is extremely complex, but may be solved by determining the appropriate granularity (i.e., specific steps and mappings).

Figure 4B:
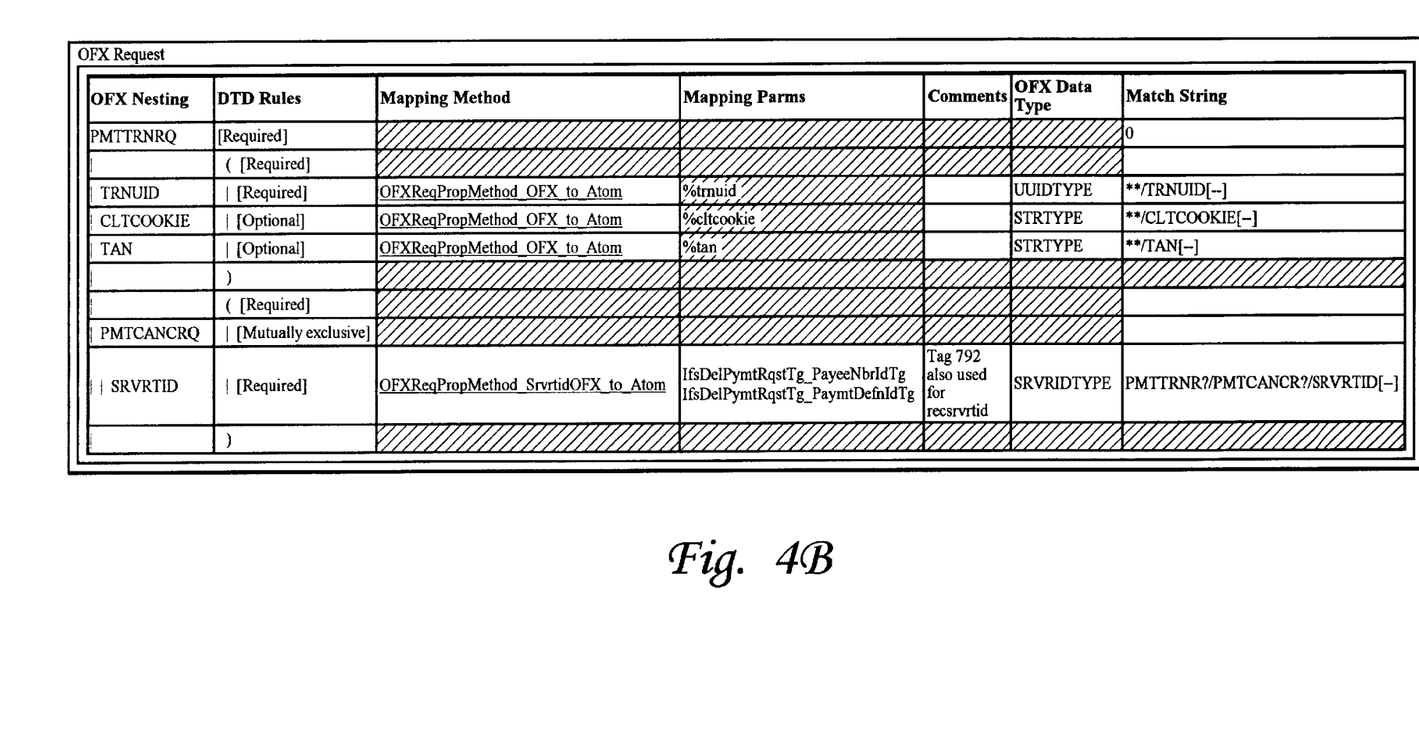

Referring to FIGS. 4A through 4E, a set of tables for mapping data between two protocols in accordance with a preferred embodiment of the present invention is illustrated. The table contain mapping data for mapping a specific OFX request, PMTCANRQ (cancel payment), to the corresponding Gold transactions and for mapping the Gold response back to the OFX protocol. FIG. 4A lists the PMTTRNRQ (payment transaction request) OFX transaction and the possible mapping variations that this transaction has to Gold transactions. OFX has one tag block (PMTTRNRQ) for anything related to a "payment"; inside that tag block are other tags which state whether the transaction is an "add," "modify," "cancel," or possibly even other variations.

As shown in FIG. 4A, each variation of the PMTTRNRQ OFX transaction is basically a completely different mapping case since each one maps to different Gold transactions ("txns"). The rules for what to look for inside the PMTTRNRQ tag block in OFX to decide which variation to use are specified in the second column titled "Transaction Modifier." In the exemplary embodiment, the table shown in FIG. 4A is an HTML table in which the variations specified within the second column are hypertext linked in the sixth column, utilizing the name of the method to be invoked for a respective variant, to the appropriate table for that variant. This emulates a relational database, which may be employed for the mapping data.

FIG. 4B illustrates the parameters of the OFX PMTTRNRQ transaction for the PMTCANRQ (cancel payment) variant. As shown, the PMTCANRQ variant is mutually exclusive with the other variants, and contains various required ("TRNUID" and "SRVTID") and optional ("CLTCOOKIE" and "TAN") fields. The mapping methods and mapping parameters for each field are provided within the table shown in FIG. 4B, together with the OFX datatype of the field and the match string employed to identify the OFX request and a PMTTRNRQ/PMTCANRQ transaction.

Figure 4C:
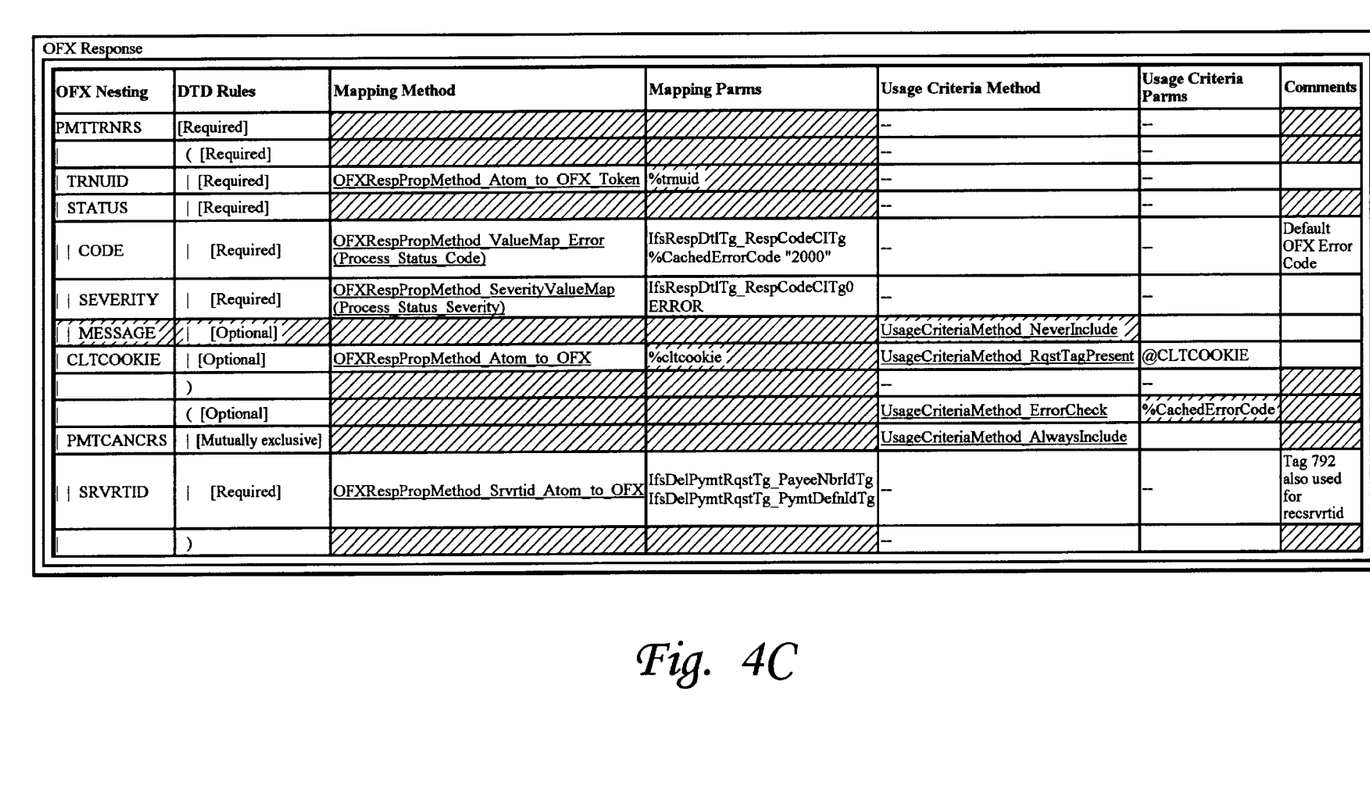
Figure 4D:
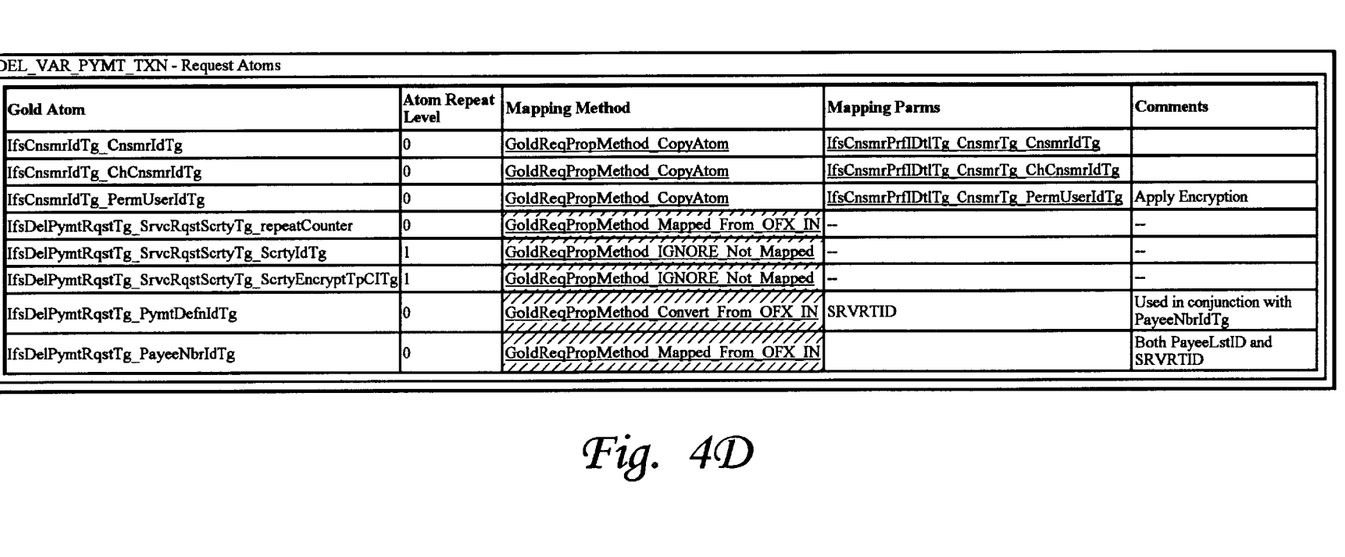
Figure 4E:
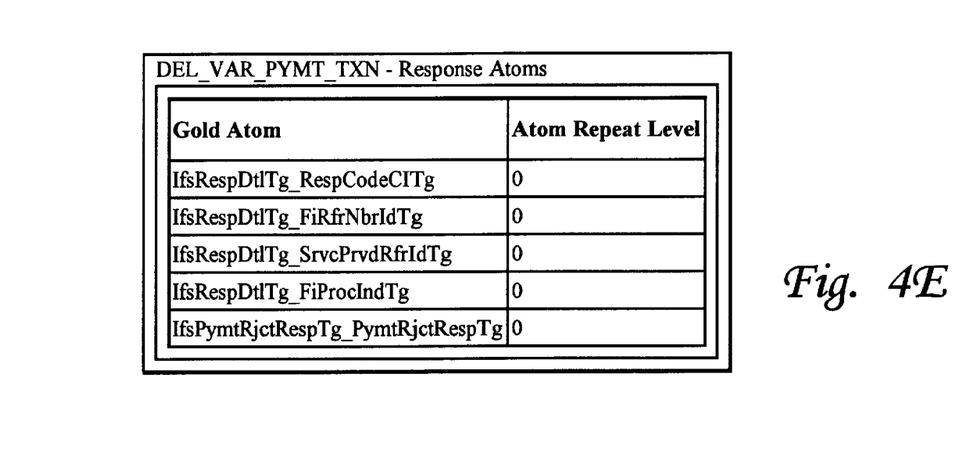

Referring back to FIG. 4A, the "mapping" link in the first column leads to the three tables in FIGS. 4C through 4E. The first table, in FIG. 4C, specifies how each OFX tag in this transaction is handled. The left two columns show the tags and containment rules which are taken directly from the OFX DTD, an online specification for OFX. Other columns contain the mapping method and parameters for mapping each tag.

The next table, in FIG. 4D, is the OFX response, containing the necessary information for creating each OFX response tag. Note that there are both response methods and parameters and usage criteria methods and parameters for optional and multiple tags since, as described above, the mapping data should contain rules concerning when to utilize optional fields and how many instances of multiple fields should be employed.

The third table, FIG. 4E, is the Gold Request and contains the list of fields for the Gold transaction(s) which is walked to be sure that all the Gold request fields are filled prior to transmitting the request. At the bottom is a list of the Gold response fields for reference only, since content within the Gold response is irrelevant if OFX does not utilize that information within the OFX response.

The present invention enables automatic generation of a conversion product for mapping datastreams between complex protocols. This provides a major reduction in the amount of manual coding required for the conversion product, and increases the product quality by reducing the amount of handcrafted code and therefore the potential for errors or bugs.

It is important to note that while the present invention has been described in the context of a fully functional data processing system and/or network, those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of automatically generating datastream mappings, comprising:
   retrieving a protocol definition for a first protocol;
   retrieving a protocol definition for a second protocol;
   retrieving mapping data defining each mapping or procedure required to convert any element in the first protocol to one or more corresponding elements in the second protocol;
   selecting an element in one of the first or second protocols; and
   generating executable code or data structures required for conversion of the selected element from the one protocol to another of the first or second protocols.

2. The method of claim 1, further comprising:
   repeating the steps of:
      selecting an element in one of the first or second protocols, and
      generating executable code or data structures required for conversion of the selected element from the one protocol to an other of the first or second protocols,
   until all elements in both protocols have been selected and executable code for conversion of all elements from the one protocol to the other protocol has been generated.

3. The method of claim 1, wherein the step of retrieving a protocol definition for a first protocol further comprises:
   retrieving a protocol definition for OFX.

4. The method of claim 1, wherein the step of retrieving a protocol definition for a first protocol further comprises:
   retrieving a protocol definition for Gold.

5. A method of automatically generating datastream mappings, comprising:
   receiving a transaction in a first protocol;
   determining which transaction was received from a protocol definition for the first protocol;
   determining, from mapping data for converting the transaction from the first protocol to a second protocol, each transaction required to perform the received transaction in the second protocol;
   formulating a set of equivalent transactions by allocating all required fields for each transaction required to perform the received transaction in the second protocol; and
   determining, from the mapping data, how to map each field within the received transaction to one or more corresponding fields in a transaction in the second protocol.

6. The method of claim 5, further comprising:
   examining each field within all transactions in the second protocol required to complete the received transaction; and
   determining, from the mapping data, whether any field has been improperly converted.

7. The method of claim 5, further comprising:
   mapping a field in the received transaction to one or more corresponding fields in the transactions required to complete the received transaction in the second protocol.

8. The method of claim 7, wherein the step of mapping a field in the received transaction to one or more corresponding fields in the transactions required to complete the received transaction in the second protocol further comprises:
   placing a value from the field in the received transaction in a field in an equivalent transaction.

9. The method of claim 7, wherein the step of mapping a field in the received transaction to one or more corresponding fields in the transactions required to complete the received transaction in the second protocol further comprises:
   employing a value from the field in the received transaction as a lookup in the mapping data to determine a value for a field within an equivalent transaction.

10. The method of claim 7, wherein the step of mapping a field in the received transaction to one or more corresponding fields in the transactions required to complete the received transaction in the second protocol further comprises:
    converting a value from the field in the received transaction to a format employed by a field within an equivalent transaction.

11. A system for automatically generating datastream mappings, comprising:
    a protocol definition for a first protocol;
    a protocol definition for a second protocol;
    mapping data defining each mapping or procedure required to convert any element in the first protocol to one or more corresponding elements in the second protocol; and
    a code generator selecting an element in one of the first or second protocols and generating executable code or data structures required for conversion of the selected element from the one protocol to an other of the first or second protocols.

12. The system of claim 11, wherein the code generator selects all elements in both protocols and generates executable code for conversion of all elements from the one protocol to the other protocol.

13. The system of claim 11, wherein the protocol definition for the first protocol further comprises:
    a protocol definition for OFX.

14. The system of claim 11, wherein the protocol definition for a first protocol further comprises:
    a protocol definition for Gold.

15. A system for automatically generating datastream mappings, comprising:
- a transaction in a first protocol; and
- a converter:
  - determining which transaction was received from a protocol definition for the first protocol;
  - determining, from mapping data for converting the transaction from the first protocol to a second protocol, each transaction required to perform the received transaction in the second protocol;
  - formulating a set of equivalent transactions by allocating all required fields for each transaction required to perform the received transaction in the second protocol; and
  - determining, from the mapping data, how to map each field within the received transaction to one or more corresponding fields in a transaction in the second protocol.

16. The system of claim 15, wherein the converter examines each field within all transactions in the second protocol required to complete the received transaction and determines, from the mapping data, whether any field has been improperly converted.

17. The system of claim 15, wherein the converter maps a field in the received transaction to one or more corresponding fields in the transactions required to complete the received transaction in the second protocol.

18. The system of claim 17, wherein the converter maps a field in the received transaction to one or more corresponding fields in the transactions required to complete the received transaction in the second protocol by placing a value from the field in the received transaction in a field in an equivalent transaction.

19. The system of claim 17, wherein the converter maps a field in the received transaction to one or more corresponding fields in the transactions required to complete the received transaction in the second protocol by employing a value from the field in the received transaction as a lookup in the mapping data to determine a value for a field within an equivalent transaction.

20. The system of claim 17, wherein the converter maps a field in the received transaction to one or more corresponding fields in the transactions required to complete the received transaction in the second protocol by converting a value from the field in the received transaction to a format employed by a field within an equivalent transaction.

21. A computer program product within a computer usable medium for automatically generating datastream mappings, comprising:
- instructions for retrieving a protocol definition for a first protocol;
- instructions for retrieving a protocol definition for a second protocol;
- instructions for retrieving mapping data defining each mapping or procedure required to convert any element in the first protocol to one or more corresponding elements in the second protocol;
- instructions for selecting an element in one of the first or second protocols; and
- instructions for generating executable code or data structures required for conversion of the selected element from the one protocol to an other of the first or second protocols.

22. The computer program product of claim 21, further comprising:
- instructions for repeating the steps of:
  - selecting an element in one of the first or second protocols, and
  - generating executable code or data structures required for conversion of the selected element from the one protocol to an other of the first or second protocols,
- until all elements in both protocols have been selected and executable code for conversion of all elements from the one protocol to the other protocol has been generated.

23. A computer program product within a computer usable medium for automatically generating datastream mappings, comprising:
- instructions for receiving a transaction in a first protocol;
- instructions for determining which transaction was received from a protocol definition for the first protocol;
- instructions for determining, from mapping data for converting the transaction from the first protocol to a second protocol, each transaction required to perform the received transaction in the second protocol;
- instructions for formulating a set of equivalent transactions by allocating all required fields for each transaction required to perform the received transaction in the second protocol; and
- instructions for determining, from the mapping data, how to map each field within the received transaction to one or more corresponding fields in a transaction in the second protocol.

24. The computer program product of claim 23, further comprising:
- instructions for examining each field within all transactions in the second protocol required to complete the received transaction; and
- instructions for determining, from the mapping data, whether any field has been improperly converted.

* * * * *